United States Patent
Liu et al.

(10) Patent No.: US 11,726,564 B2
(45) Date of Patent: Aug. 15, 2023

(54) OPTICAL SYSTEM PROVIDING ACCURATE EYE-TRACKING AND RELATED METHOD

(71) Applicant: Ganzin Technology, Inc., Taipei (TW)

(72) Inventors: Kuan-Ling Liu, Kaohsiung (TW); Po-Jung Chiu, Nantou County (TW); Yi-Heng Wu, Tainan (TW); Kuei-An Li, New Taipei (TW); Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 0 days.

(21) Appl. No.: 17/849,736

(22) Filed: Jun. 27, 2022

(65) Prior Publication Data

US 2022/0413607 A1 Dec. 29, 2022

Related U.S. Application Data (60) Provisional application No. 63/215,984, filed on Jun. 28, 2021.

(51) Int. Cl.
*G06F 3/01* (2006.01)
*G06F 3/04815* (2022.01)
(Continued)

(52) U.S. Cl.
CPC ......... *G06F 3/013* (2013.01); *G02B 27/0025* (2013.01); *G02B 27/0093* (2013.01);
(Continued)

(58) Field of Classification Search
None
See application file for complete search history.

(56) References Cited

U.S. PATENT DOCUMENTS

| 9,829,973 | B2 | 11/2017 | Vennström |
| 10,845,595 | B1 | 11/2020 | Sohn |

(Continued)

FOREIGN PATENT DOCUMENTS

| CN | 103635849 A | 3/2014 |
| CN | 105979224 A | 9/2016 |

(Continued)

OTHER PUBLICATIONS

Liu, the specification, including the claims, and drawings in the U.S. Appl. No. 17/849,726, filed Jun. 27, 2022.
(Continued)

*Primary Examiner* — Amare Mengistu
*Assistant Examiner* — Sarvesh J Nadkarni
(74) *Attorney, Agent, or Firm* — Winston Hsu (57) ABSTRACT

An optical system includes an eye-tracker and a head-mounted display for providing accurate eye-tracking in interactive virtual environment. The eye-tracker includes a sensor module captures one or multiple eye images of a user. The head-mounted display includes a processor and a display for presenting the user interface. The processor provides a user interface which includes one or multiple UI elements based on one or multiple gaze points of the user which are computed based on the one or multiple eye images, acquires the distance between an estimated gaze point of the user and each UI element, acquires the score of each UI element based on the distance between the estimated gaze point and each UI element, and sets a specific UI element with a highest score as the target UI element associated with the estimated gaze point of the user.

15 Claims, 9 Drawing Sheets

(51) Int. Cl.
 *G06F 3/04842* (2022.01)
 *G02B 27/00* (2006.01)
 *G02B 27/01* (2006.01)
(52) U.S. Cl.
 CPC ....... *G02B 27/0101* (2013.01); *G02B 27/017* (2013.01); *G02B 27/0179* (2013.01); *G06F 3/04815* (2013.01); *G06F 3/04842* (2013.01); *G02B 2027/014* (2013.01); *G02B 2027/0187* (2013.01)

(56) References Cited

U.S. PATENT DOCUMENTS

| | | | |
|---|---|---|---|
| 10,936,060 B2 | 3/2021 | Eraslan | |
| 11,144,052 B2 | 10/2021 | Stent | |
| 11,423,569 B1 | 8/2022 | Carlsson | |
| 2009/0315827 A1 | 12/2009 | Elvesjö | |
| 2014/0380230 A1* | 12/2014 | Venable | G06F 3/013 715/781 |
| 2015/0015483 A1 | 1/2015 | Leigh | |
| 2015/0049112 A1 | 2/2015 | Liu | |
| 2015/0091793 A1 | 4/2015 | Lee | |
| 2015/0177833 A1* | 6/2015 | Vennstrom | G06T 7/73 345/156 |
| 2015/0234460 A1* | 8/2015 | Irie | G06F 3/013 345/156 |
| 2017/0351329 A1* | 12/2017 | Picard | G06V 10/44 |
| 2017/0354883 A1 | 12/2017 | Benedetto | |
| 2019/0056785 A1* | 2/2019 | Suk | G06F 3/0485 |
| 2019/0113970 A1 | 4/2019 | Nijs | |
| 2021/0012559 A1* | 1/2021 | Lindh | G06T 15/50 |
| 2021/0048938 A1* | 2/2021 | Scott, II | G06F 16/5866 |
| 2021/0350624 A1 | 11/2021 | Komp | |
| 2022/0124279 A1 | 4/2022 | Barros | |

FOREIGN PATENT DOCUMENTS

| | | |
|---|---|---|
| TW | 201211936 A1 | 3/2012 |
| TW | 202037152 A | 10/2020 |

OTHER PUBLICATIONS

Liu, the specification, including the claims, and drawings in the U.S. Appl. No. 17/849,727, filed Jun. 27, 2022.

* cited by examiner

OPTICAL SYSTEM PROVIDING ACCURATE EYE-TRACKING AND RELATED METHOD

CROSS REFERENCE TO RELATED APPLICATIONS

This application claims the benefit of U.S. Provisional Application No. 63/215,984, filed on Jun. 28, 2021. The content of the application is incorporated herein by reference.

BACKGROUND OF THE INVENTION

1. Field of the Invention

The present invent is related to an optical system with accurate eye-tracking function and a related method, more particularly, to an optical system which provides accurate eye-tracking in interactive virtual environments and a related method.

2. Description of the Prior Art

Virtual reality (VR) is an interactive computer-generated experience taking place within a simulated environment, that incorporates mainly auditory and visual, but also other types of sensory feedback like haptic. Augmented reality (AR) provides an interactive experience of a real-world environment where the objects that reside in the real world are enhanced by computer-generated perceptual information. Mixed reality (MR) is the merging of real and virtual worlds to produce new environments and visualizations, where physical and digital objects co-exist and interact in real time. Most of existing VR/AR/MR applications are controlled by user hands using joysticks or touch screens, but the burden of carry these control devices may cause inconvenience. By incorporating eye-tracking capabilities into VR/AR/MR headsets, the user can use the eyes as an operational interface, wherein various visual elements can trigger certain responses and behaviors.

Eye tracking is a technology for acquiring eye positions and eye movement by measuring either the point of gaze or the motion of an eye relative to the head. Most information presented by a computer is provided to a user through visual information on a user interface presented on a display. Typically, a user interface contains multiple user interface (UI) elements each including a graphic element and a hit box. The graphic element determines the appearance of the UI element and may be associated with the function of the UI element. The hit box of an UI element is a virtual element which is invisible to the user and is connected to a corresponding event handler. When a gaze command of the user triggers the hit box of a UI element, a predetermined action associated with the UI element may be performed.

In a prior-art optical system, the gaze-based interaction is provided based on the absolute position of the estimated gaze point. More specifically, in order to trigger a UI element, the user is required to locate his gaze within the hit box of the UI element. Such method requires high accuracy of an eye-tracker and a tiny change in accuracy may result in significant change in the user experience. Therefore, there is a need of an optical system and a related method for improving user experience and the accuracy of gaze-based interaction.

SUMMARY OF THE INVENTION

The present invention provides an optical system which provides accurate eye-tracking in interactive virtual environment and includes an eye-tracker and a head-mounted display. The eye-tracker includes a sensor module configured to capture one or multiple eye images of a user. The head-mounted display includes a processor and a display. The processor is configured to provide a user interface which includes one or multiple UI elements based on one or multiple gaze points of the user which are computed based on the one or multiple eye images; acquire a distance between at least one estimated gaze point of the user and each UI element; acquire a score of each UI element based on the distance between the at least one estimated gaze point of the user and each UI element; and set a first UI element with a highest score among the one or multiple UI elements as a target UI element associated with the at least one estimated gaze point of the user. The display is configured to present the user interface.

The present invention also provides a method of providing accurate eye-tracking in interactive virtual environment. The method includes providing a user interface including one or multiple UI elements; capturing one or multiple eye images of a user during an eye-tracking operation; computing one or multiple estimated gaze points of the user based on the one or multiple eye images of the user; acquiring a distance between at least one estimated gaze point of the user and each UI element; acquiring a score of each UI element based on the distance between the at least one estimated gaze point of the user and each UI element; and setting a first UI element with the highest score among the one or multiple UI elements as a target UI element associated with the at least one estimated gaze point of the user.

The present invention also provides an optical system which provides accurate eye-tracking in interactive virtual environment and includes an eye-tracker, a data base and a head-mounted display. The eye-tracker includes a sensor module configured to capture one or multiple eye images of a user. The data base is used for storing a set of predefined trajectory patterns each corresponding to a specific operation link associated with the one or multiple UI elements. The head-mounted display includes a processor and a display. The processor is configured to provide a user interface which includes one or multiple UI elements based on one or multiple gaze points of the user which are computed based on the one or multiple eye images; acquire a gaze trajectory of the user based on the one or multiple gaze points of the user; and when the gaze trajectory of the user matches at least one predefined trajectory pattern, executing the specific operation link corresponding to the at least one predefined trajectory pattern. The display is configured to present the user interface.

The present invention also provides a method of providing accurate eye-tracking in interactive virtual environment. The method includes providing a user interface including one or multiple UI elements; storing a set of predefined trajectory patterns each corresponding to a specific operation link associated with the one or multiple UI elements; capturing one or multiple eye images of a user during an eye-tracking operation; computing one or multiple estimated gaze points of the user based on the one or multiple eye images of the user; acquiring a gaze trajectory of the user based on the one or multiple gaze points of the user; and when the gaze trajectory of the user matches at least one predefined trajectory pattern, executing the specific operation link corresponding to the at least one predefined trajectory pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
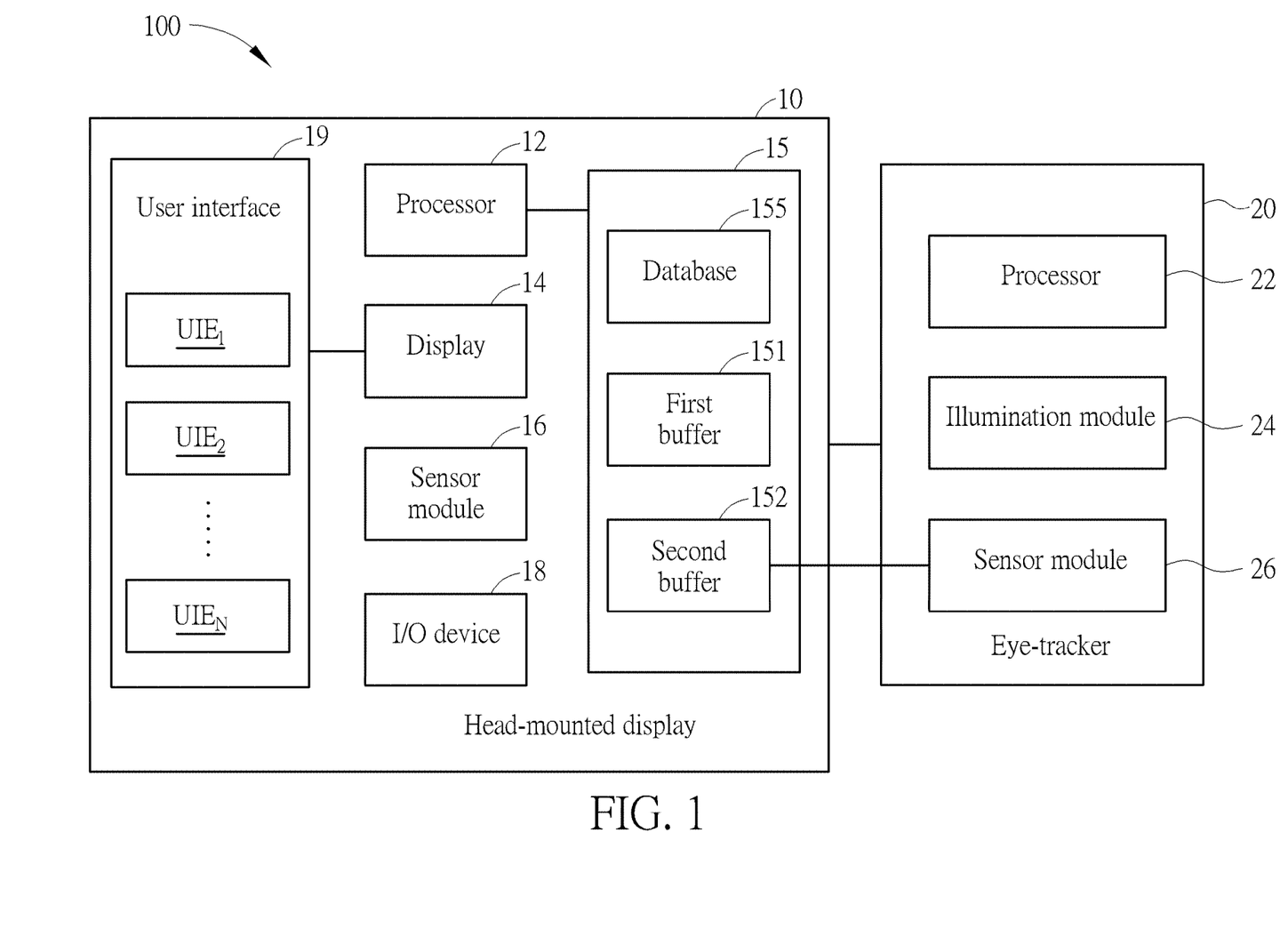
FIG. 1 is a functional diagram illustrating an optical system capable of providing accurate eye-tracking in interactive virtual environments according to an embodiment of the present invention.
Figure 2:
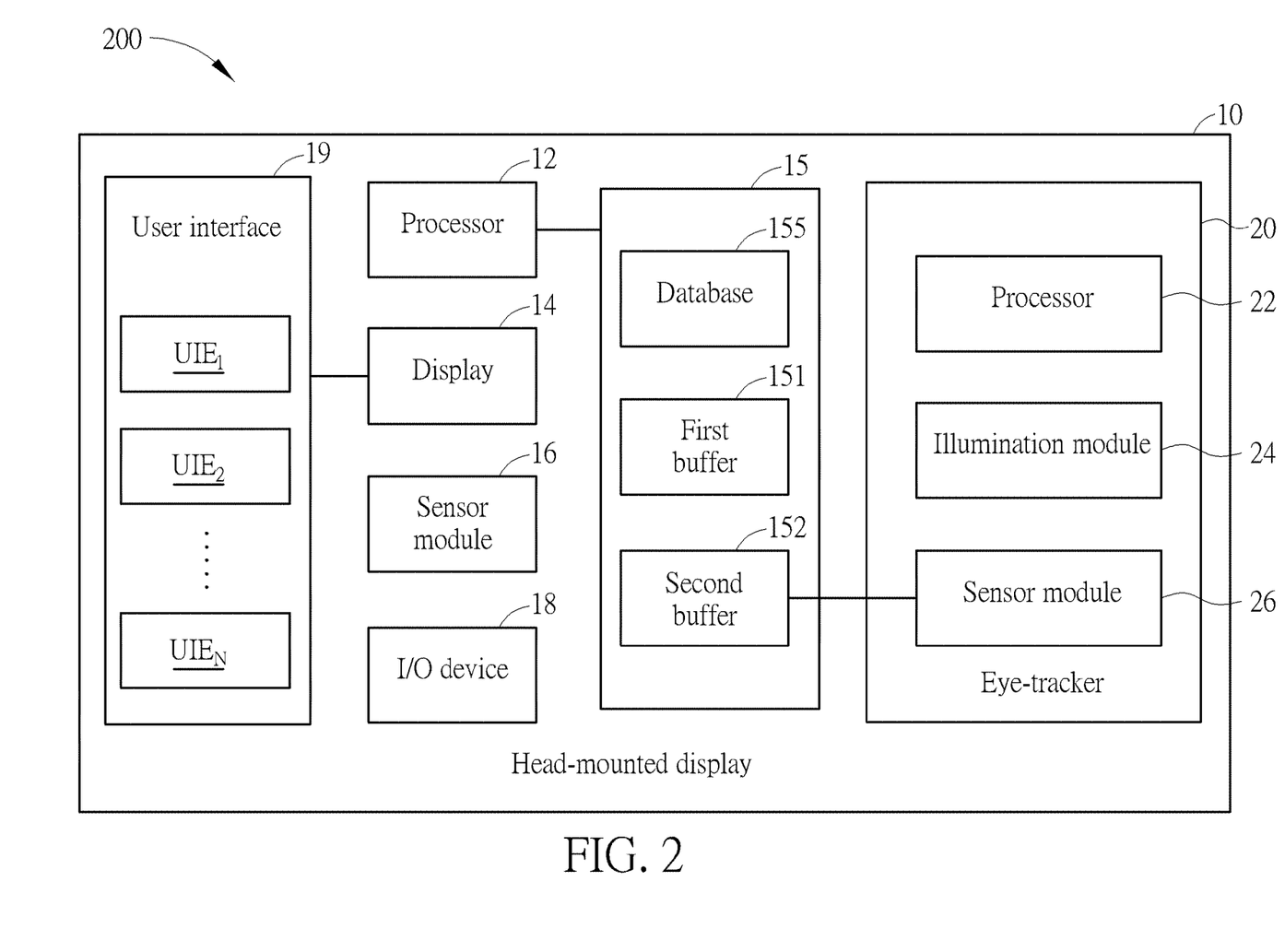
FIG. 2 is a functional diagram illustrating an optical system capable of providing accurate eye-tracking in interactive virtual environments according to another embodiment of the present invention.

FIG. 1 is a functional diagram illustrating an optical system 100 capable of providing accurate eye-tracking in interactive virtual environments according to an embodiment of the present invention. FIG. 2 is a functional diagram illustrating an optical system 200 capable of providing accurate eye-tracking in interactive virtual environments according to another embodiment of the present invention.

In the embodiment illustrated in FIG. 1, the optical system 100 includes a head-mounted display 10 and an eye-tracker 20. The head-mounted display 10 includes a processor 12, a display 14, a memory 15, a sensor module 16, an I/O device 18 and a user interface 19, wherein the memory 15 includes a database 155, a first buffer 151 and a second buffer 152. The eye-tracker 20 includes a processor 22, an illumination module 24, and a sensor module 26. The processor 12 is configured to control the operation of the head-mounted display 10, and the processor 22 is configured to control the operation of the eye-tracker 20.

In the embodiment illustrated in FIG. 2, the optical system 200 may be a head-mounted display 10 which includes a processor 12, a display 14, a memory 15, a sensor module 16, an I/O device 18, a user interface 19 and an eye-tracker 20. The memory 15 includes a database 155, a first buffer 151 and a second buffer 152. The eye-tracker 20 includes a processor 22, an illumination module 24, and a sensor module 26. The processor 12 is configured to control the operation of the head-mounted display 10, and the processor 22 is configured to control the operation of the eye-tracker 20.

In another embodiment of the optical systems 100 and 200, the processor 22 may be omitted. More specifically, the head-mounted display 10 and the eye tracker 20 may share the same processor 12 which is configured to control the operation of the head-mounted display 10 and the eye-tracker 20.

In the optical systems 100 and 200, the illumination module 24 may include one or multiple infrared light-emitting diodes (LEDs) for illuminating the eyes of the user in order to guarantee the necessary contrast between the iris and the pupil regardless of the eye color, particularly in a very dark or bright background, thereby increasing the accuracy of the sensor module 26 in the eye tracker 20 when registering the light reflected by the user eyes. However, the implementation of the illumination module 24 does not limit the scope of the present invention.

In the optical system 100 or 200, the I/O device 18 is configured to receive the command from the user. In an embodiment, the I/O device 18 may include any type of handed controller (such as a game pad or a game console) and/or any form of haptic device (such as a suit or a glove). The I/O device 18 is configured to detect and transfer the user's motion signal to the processor 12 of the optical system 100 or 200. In an embodiment, the processor 12 may control the operation of the optical system 100 or 200 based solely on the user command received by the I/O device 18. In another embodiment, the processor 12 may control the operation of the optical system 100 or 200 based on both the user commands received by the I/O device 18 and the gaze commands received by the UI elements $UIE_1$-$UIE_N$ of the user interface 19.

Figure 3:
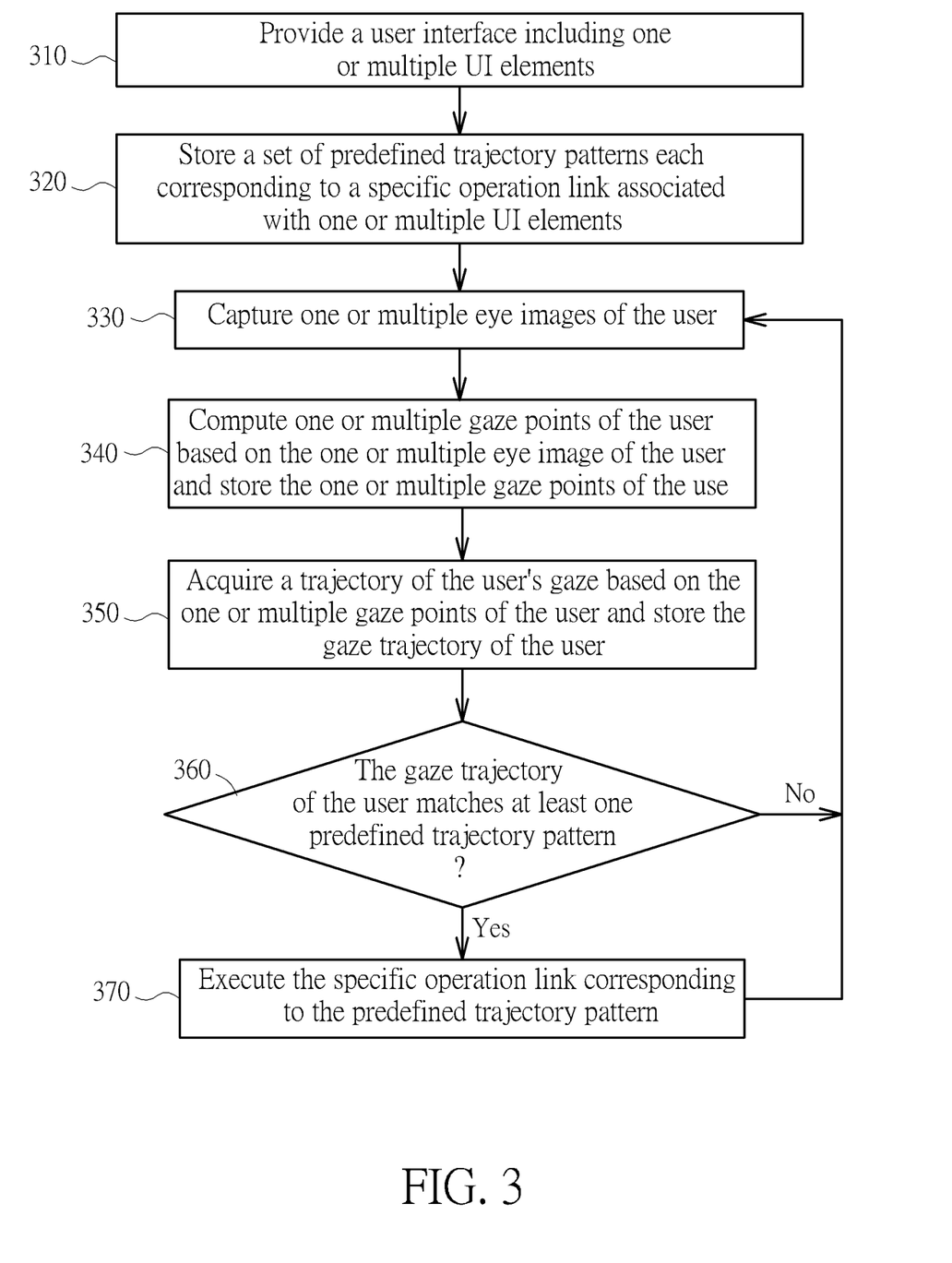
FIG. 3 is a flowchart illustrating a method of providing trajectory-based interaction according to an embodiment of the present invention.

FIG. 3 is a flowchart illustrating a method of providing trajectory-based interaction according to an embodiment of the present invention.

Step 310: provide a user interface including one or multiple user interface (UI) elements.

Step 320: store a set of predefined trajectory patterns each corresponding to a specific operation link associated with one or multiple UI elements.

Step 330: capture one or multiple eye images of the user.

Step 340: compute one or multiple gaze points of the user based on the one or multiple eye image of the user and store the one or multiple gaze points of the user.

Step 350: acquire a gaze trajectory of the user based on the one or multiple gaze points of the user and store the gaze trajectory of the user.

Step 360: determine whether the gaze trajectory of the user matches at least one predefined trajectory pattern; if yes, execute step 370; if no, execute step 330.

Step 370: execute the specific operation link corresponding to the predefined trajectory pattern.

In step 310, the user interface 19 containing one or multiple UI elements $UIE_1$-$UIE_N$ may be presented on the display 14 in step 310, wherein N is a positive integer. In an embodiment, the UI elements $UIE_1$-$UIE_N$ may be visual information presented on the display 14. In another embodiment, each of the UI elements $UIE_1$-$UIE_N$ may be an abstract element which is invisible to the user. If a UI element is configured to interact with the user, it may further be connected with an event handler which is associated with a specific operation of the optical system 100 or 200 and is handled by the processor 12.

The UI elements $UIE_1$-$UIE_N$ are configured to add interactivity to the user interface 19 and provide gaze-based interaction. Each UI element may be associated with, but not limited to, input control, navigation control, and information display. Each UI element includes a graphic element and a hit box. The graphic element determines the appearance of the UI element and may be associated with the function of the UI element. In an embodiment, the graphic element of a UI element may be a checkbox, a radio button, a dropdown lists, a list box, a toggle button, toggles, or a date/time picker for input control. In another embodiment, the graphic element of a UI element may be a breadcrumb, a slider, a pagination, an icon, or an image carousel for navigation control. In yet another embodiment, the graphic element of a UI element may be a tooltip, a progress bar, a notification, a message box, or a modal window for information display. However, the appearance of the graphic element in each UI element does not limit the scope of the present invention.

The hit box of an UI element is a virtual element which is invisible to the user and is connected to a corresponding event handler. When a gaze command associated with the one or multiple gaze points of the user triggers the hit boxes of one or multiple UI elements, a predetermined action associated with each UI element may be performed. When one or multiple trigger conditions are satisfied, the UI element is triggered by the gaze command. In the present invention, a trigger condition is satisfied when the gaze trajectory of the user matches a predefined trajectory pattern which includes one or multiple segments. Exemplary segment includes, but not limited to, when the user's gaze is moved from a first point to a second point in the UI interface 19. However, the type of the trigger conditions associated with each UI element does not limit the scope of the present invention.

In step 320, the set of predefined trajectory patterns each corresponding to a specific operation link associated with one or multiple UI elements may be stored in the database 155 of the memory 15 in the optical system 100 or 200. An exemplary predefined trajectory pattern includes, but not limited to, an M-segment trajectory pattern, wherein M is a positive integer. For example, a two-segment trajectory pattern sequentially includes a first segment associated with the user moving the gaze from a first point to a second point in the UI interface 19 and a second segment associated with the user moving the gaze from the second point to a third point in the UI interface 19. However, the number of M does not limit the scope of the present invention.

In the optical system 100, the sensor module 26 in the eye tracker 20 includes at least one image sensor (eye sensor) which is configured to capture one or multiple eye images of the user in step 330. The processor 22 in the eye tracker 20 is configured to receive the one or multiple eye images captured by the sensor module 26 and compute the one or multiple gaze points of the user in step 340. In addition, the processor 22 in the eye tracker 20 may further compute other eye-tracking related information based on the one or multiple eye images of the user, such as the confidence and the accuracy of estimated gaze point, the eyeball location in 3D coordinate and pupil-related information (e.g., size). The algorithms for eye-tracking operation may be implemented as, but not limited to, a process/software/firmware executed on the processor 22 of the eye tracker 20. Also, the one or multiple gaze points of the user may be stored in the first buffer 151 of the memory 15 in step 340.

In the optical system 200, the sensor module 26 in the eye tracker 20 includes at least one image sensor (eye sensor) which is configured to capture the one or multiple eye images of the user in step 330. The processor 12 may receive the one or multiple eye images captured by the sensor module 26 of the eye-tracker 20 and compute the one or multiple gaze points of the user in step 340. In addition, the processor 12 may further compute other eye-tracking related information based on the one or multiple eye images of the user, such as the confidence and the accuracy of estimated gaze point, the eyeball location in 3D coordinate and pupil-related information (e.g., size). The algorithms for eye-tracking operation may be implemented as, but not limited to, a process/software/firmware executed on the processor 12 of the optical system 200. Also, the one or multiple gaze points of the user may be stored in the first buffer 151 of the memory 15 in step 340.

In the optical systems 100 and 200, the sensor module 16 may include at least one scene sensor configured to capture the one or multiple images of the user's field of view, at least one audio sensor (such as a microphone) configured to receive the audio signal from the user, and/or at least one motion sensor (such as a gyro and/or an accelerometer) configured to detect the motion of the user (especially the head movement).

In step 350, the processor 12 is configured to acquire the gaze trajectory of the user based on the one or multiple gaze points of the user. More specifically, the processor 12 is configured to identify the movement between two consecutive gaze points (a segment) of the user and provide the gaze trajectory of the user by connecting all consecutive segments or by connecting M consecutive segments, wherein M is a positive integer. For example, the processor 12 may provide the gaze trajectory of the user by connecting the last M consecutive segments. Also, the identified gaze segments of the user may be stored in the second buffer 152 in the memory 15.

In step 360, the processor 12 is configured to determine whether the gaze trajectory of the user matches at least one predefined trajectory pattern. More specifically, the processor 12 is configured to compare the gaze trajectory of the user identified in step 350 with the set of predefined trajectory patterns stored in the database 155. If the gaze trajectory of the user does not match any predefined trajectory pattern, step 330 is executed for continuing the eye-tracking operation. If the gaze trajectory of the user matches at least one predefined trajectory pattern, step 370 is executed for executing the specific operation link corresponding to the matched predefined trajectory pattern. The specific operation link may include one or multiple predefined actions, such as, but not limited to, content selection, previous, next, setting, close, back, home, show notification and lock screen.

Figure 4A:
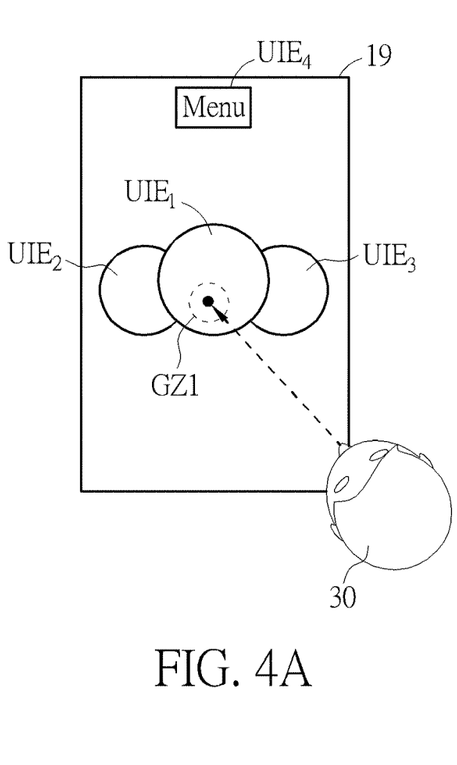
FIGS. 4A-4C are diagrams illustrating a method of providing trajectory-based interaction according to an embodiment of the present invention.
Figure 4B:
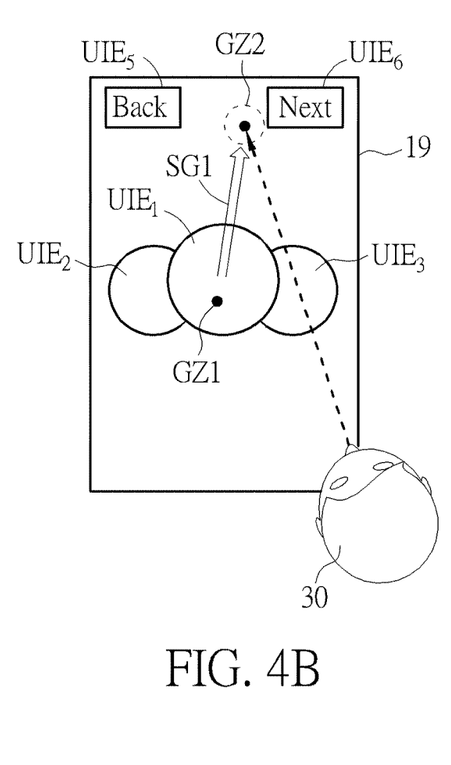
Figure 4C:
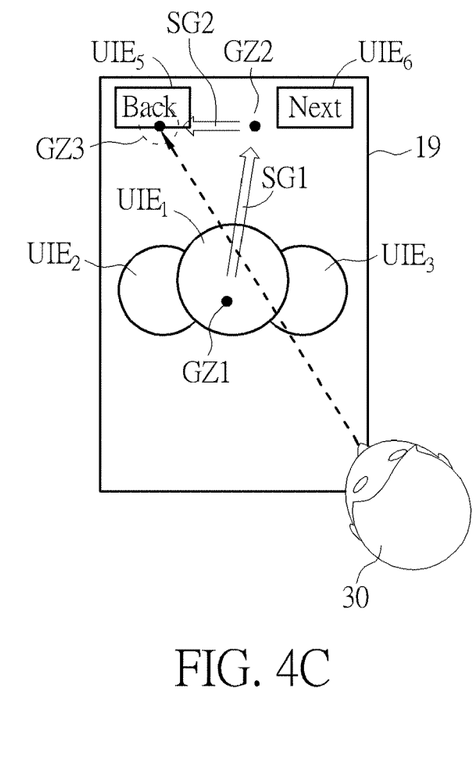

FIGS. 4A-4C are diagrams illustrating the method of providing trajectory-based interaction according to an embodiment of the present invention. GZ1-GZ3 represent the gaze points of a user 30 which are calculated in step 340. SG1 and SG2 are segments of the trajectory of the user's gaze which are identified in step 350. In the initial state depicted in FIG. 4A, it is assumed that the user interface 19 includes four UI elements $UIE_1$-$UIE_4$. Two more UI elements $UIE_5$ and $UIE_6$ may be presented in the user interface 19 during subsequent gaze-based interaction depicted in FIGS. 4B and 4C.

First, the user's gaze is fixed at the center of the user interface 19 with the intention to select the UI elements $UIE_1$, as depicted in FIG. 4A. Next, the user moves his gaze from the center of the user interface 19 to a top-center position of the user interface 19 with the intention to select the UI elements $UIE_4$, as depicted in FIG. 4B. Finally, the user's gaze is moved from the top-center position of the user interface 19 to a top-left position of the user interface 19, with the intention to select the UI elements $UIE_5$, as depicted in FIG. 4C.

The eye/head movement of the user in FIGS. 4A-4C may be recorded by the sensor module 26 in the eye tracker 20 by capturing the one or multiple eye images in step 330. Based on the gaze points GZ1-GZ3 computed based on the eye images of the user in step 340, the processor 12 may identify the segments SG1-SG2 in the gaze trajectory of the user in step 350, wherein the segment SG1 includes the movement of the user's gaze from the gaze point GZ1 to the gaze point GZ2 (a move-up segment), and the segment SG2 includes the movement of the user's gaze from the gaze point GZ2 to the gaze point GZ3(a move-left segment).

If the gaze trajectory of the user including the segments SG1 and SG2 matches at least one predefined trajectory pattern, the specific operation link corresponding to the matched predefined trajectory pattern may be executed in step 370. In the embodiment depicted in FIGS. 4A-4C, the specific operation link includes the "unfold menu" action associated with the UI element $UIE_4$, the "content selection" action associated with the UI elements $UIE_5$ and $UIE_6$ and the "back" action associated with the UI element $UIE_5$. More specifically, the UI element $UIE_4$ and the UI element $UIE_5$ are sequentially triggered by the gaze trajectory of the user when the segments SG1 and SG2 match at least one predefined trajectory pattern.

Figure 5A:
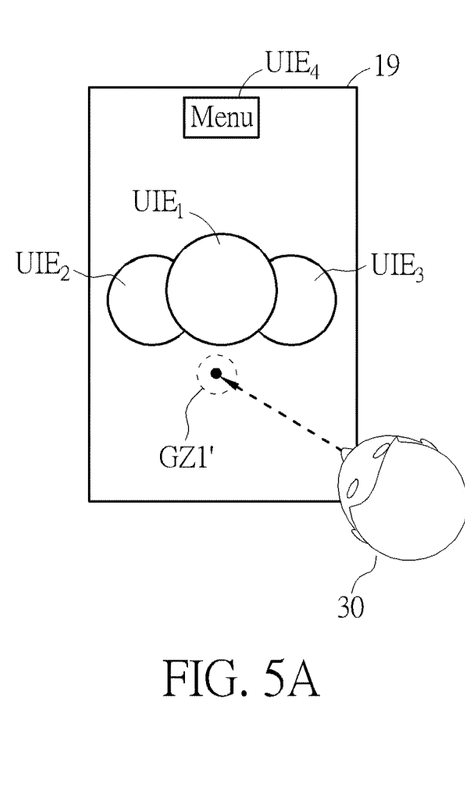
FIGS. 5A-5C are diagrams illustrating a method of providing trajectory-based interaction according to another embodiment of the present invention.
Figure 5B:
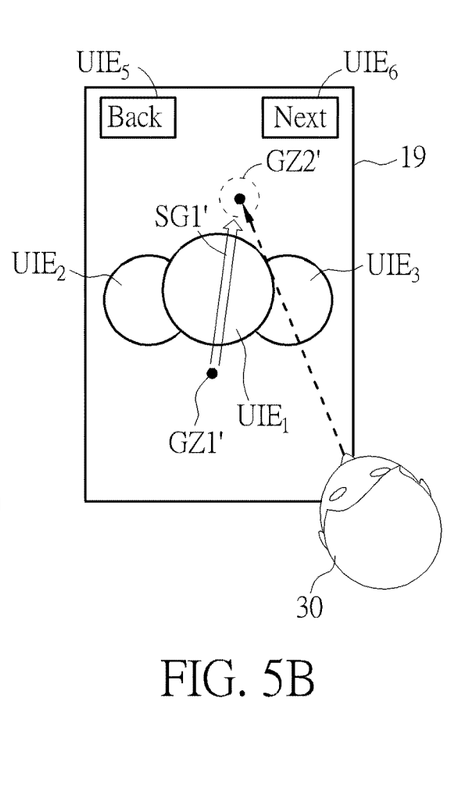
Figure 5C:
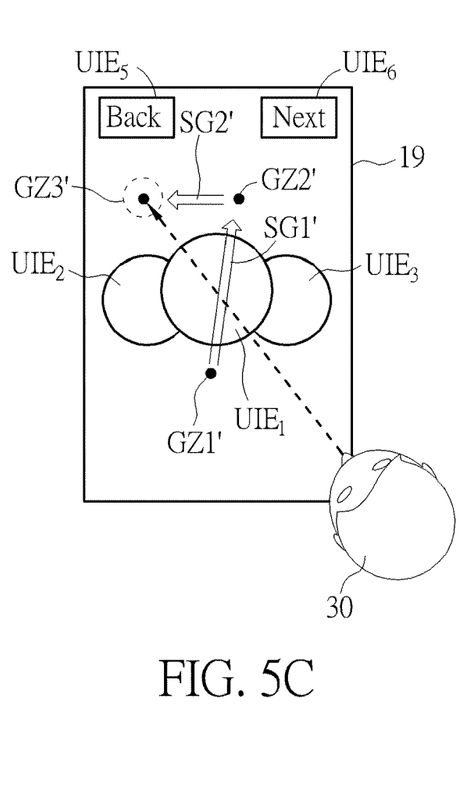

FIGS. 5A-5C are diagrams illustrating the method of providing trajectory-based interaction according to another embodiment of the present invention. GZ1'-GZ3' represent the gaze points of a user 30 which are calculated in step 340. SG1' and SG2' are segments of the trajectory of the user's gaze which are identified in step 350. In the initial state depicted in FIG. 5A, it is assumed that the user interface 19 includes four UI elements $UIE_1$-$UIE_4$. Two more UI elements $UIE_5$ and $UIE_6$ may be presented in the user interface 19 during subsequent gaze-based interaction depicted in FIGS. 5B and 5C.

The eye/head movement of the user in FIGS. 5A-5C may be recorded by the sensor module 26 in the eye tracker 20 by capturing the one or multiple eye images in step 330. Based on the gaze points GZ1'-GZ3' computed based on the eye images of the user in step 340, the processor 12 may identify the segments SG1'-SG2' in the gaze trajectory of the user in step 350, wherein the segment SG1' includes the movement of the user's gaze from the gaze point GZ1' to the gaze point GZ2' (a move-up segment), and the segment SG2 includes the movement of the user's gaze from the gaze point GZ2' to the gaze point GZ3'(a move-left segment).

If the eye-tracker 20 does not have high accuracy, the estimated gaze points GZ1'-GZ3' depicted in FIGS. 5A-5C may significantly deviate from the actual gaze points GZ1-GZ3 depicted in FIGS. 4A-4C. However, the gaze trajectory of the user including the segments SG1' and SG2' also matches at least one predefined trajectory pattern, and the specific operation link corresponding to the matched predefined trajectory pattern may thus be executed in step 370. In other words, even if the accurate location of the gaze trajectory of the user cannot be acquired due to low accuracy of the eye-tracking application, the specific operation link corresponding to the matched predefined trajectory pattern may still be executed in the present invention.

Figure 6:
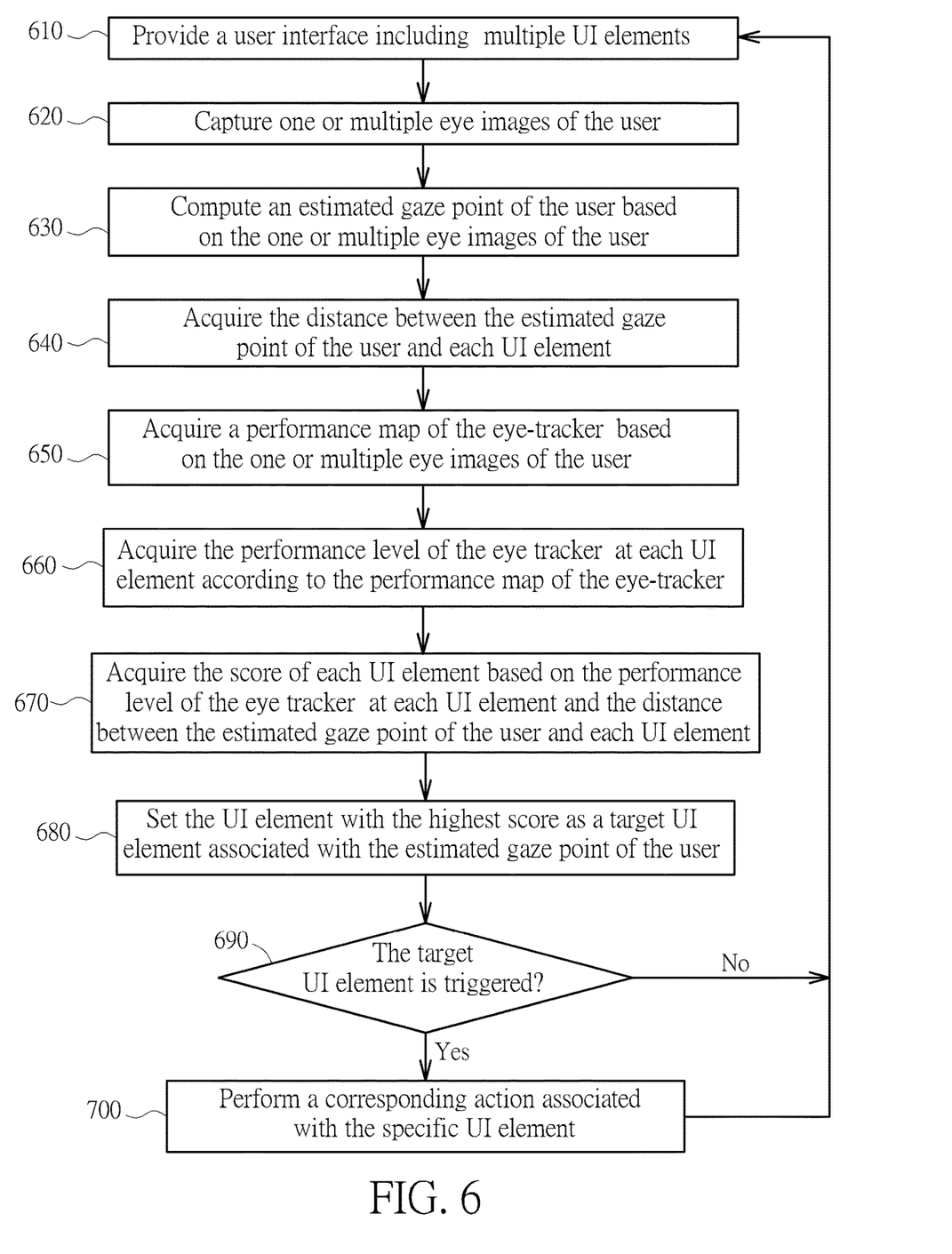
FIG. 6 is a flowchart illustrating a method of providing score-based interaction according to an embodiment of the present invention.

FIG. 6 is a flowchart illustrating a method of providing score-based interaction according to an embodiment of the present invention.

Step 610: provide a user interface including multiple UI elements.

Step 620: capture one or multiple eye images of the user.

Step 630: compute an estimated gaze point of the user based on the one or multiple eye images of the user.

Step 640: acquire the distance between the estimated gaze point of the user and each UI element.

Step 650: acquire a performance map of the eye-tracker 20 based on the one or multiple eye images of the user.

Step 660: acquire the performance level of the eye tracker 20 at each UI element according to the performance map of the eye-tracker 20.

Step 670: acquire the score of each UI element based on the performance level of the eye tracker 20 at each UI element and the distance between the estimated gaze point of the user and each UI element.

Step 680: set the UI element with the highest score as a target UI element associated with the estimated gaze point of the user.

Step 690: determine whether the target UI element is triggered; if yes, execute step 700; if no, execute step 610.

Step 700: perform a corresponding action associated with the specific UI element; execute step 610.

Steps 610, 620 and 630 may be executed in the same manner as steps 310, 330 and 340, respectively. In step 640, the processor 12 is configured to acquire the distance between the estimated gaze point of the user and each UI element.

Figure 7:
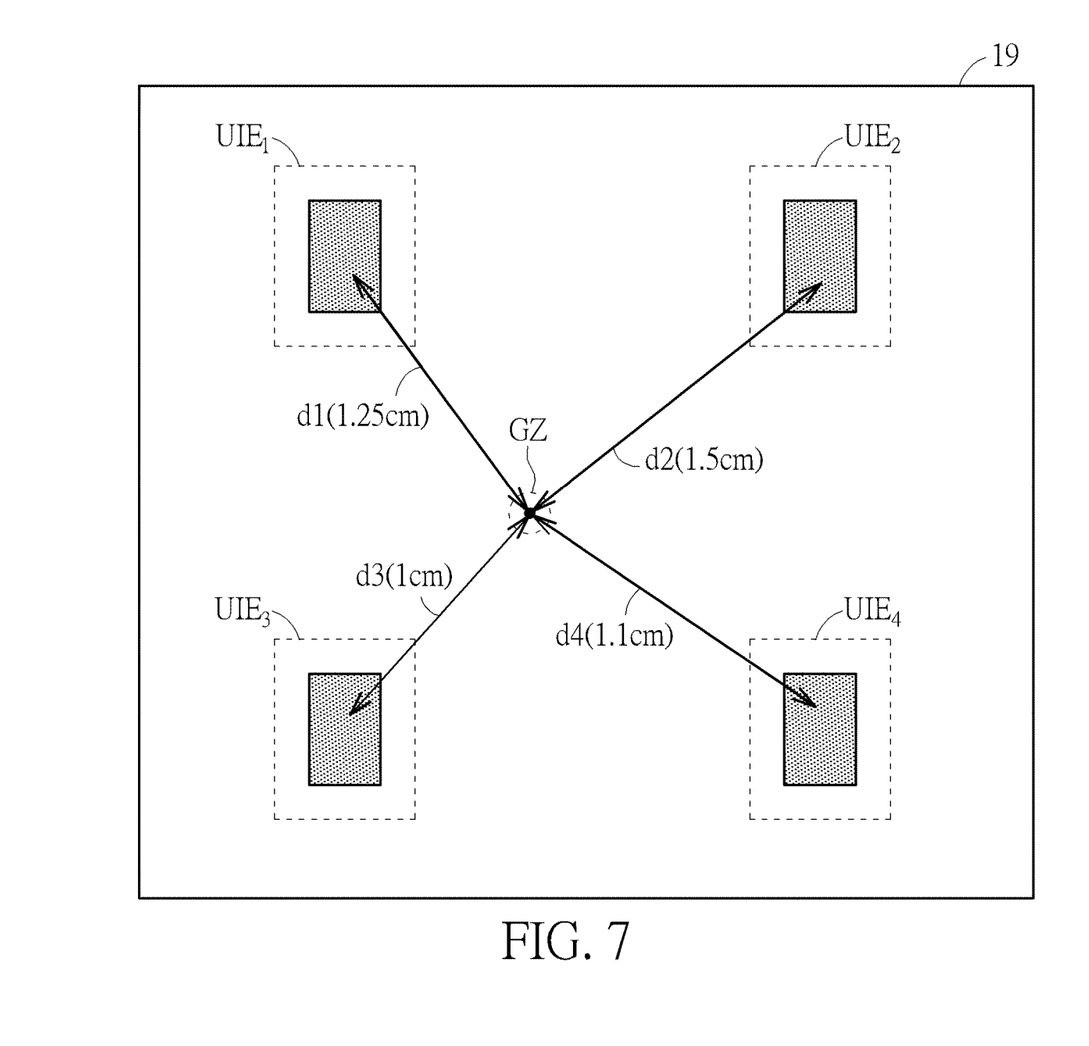
FIG. 7 is a diagram illustrating a method of providing score-based interaction according to an embodiment of the present invention.

FIG. 7 is a diagram illustrating the method of providing score-based interaction according to an embodiment of the present invention. For illustrative purpose, FIG. 7 depicts the embodiment of N=4 in which the user interface 19 includes four UI elements $UIE_1$-$UIE_4$. GZ represents the estimated gaze point of the user computed based on the one or multiple eye image of the user in step 630, d1 represents the distance between the estimated gaze point GZ and the UI element $UIE_1$, d2 represents the distance between the estimated gaze point GZ and the UI element $UIE_2$, d3 represents the distance between the estimated gaze point GZ and the UI element $UIE_3$, and d4 represents the distance between the estimated gaze point GZ and the UI element $UIE_4$.

In step 650, the processor 12 is configured to acquire the performance map of the eye-tracker 20 based on the one or multiple eye images of the user and an initial field of view of the user. The performance map represents the performance of the eye-tracking operation of the eye-tracker 20 relative to the initial field of view of the user which is the field of view of the user when the user looks straight ahead. Since the eye tracker 20 is disposed at a fixed location in the sensor module 26 which the user may put on, the sensor module 26 only moves with the user's head movement, but the user's eye movement does not influence the location of the sensor module 26. Thus, the performance map may vary with the user's head motion, but is independent of the user's eye movement.

Figure 8:
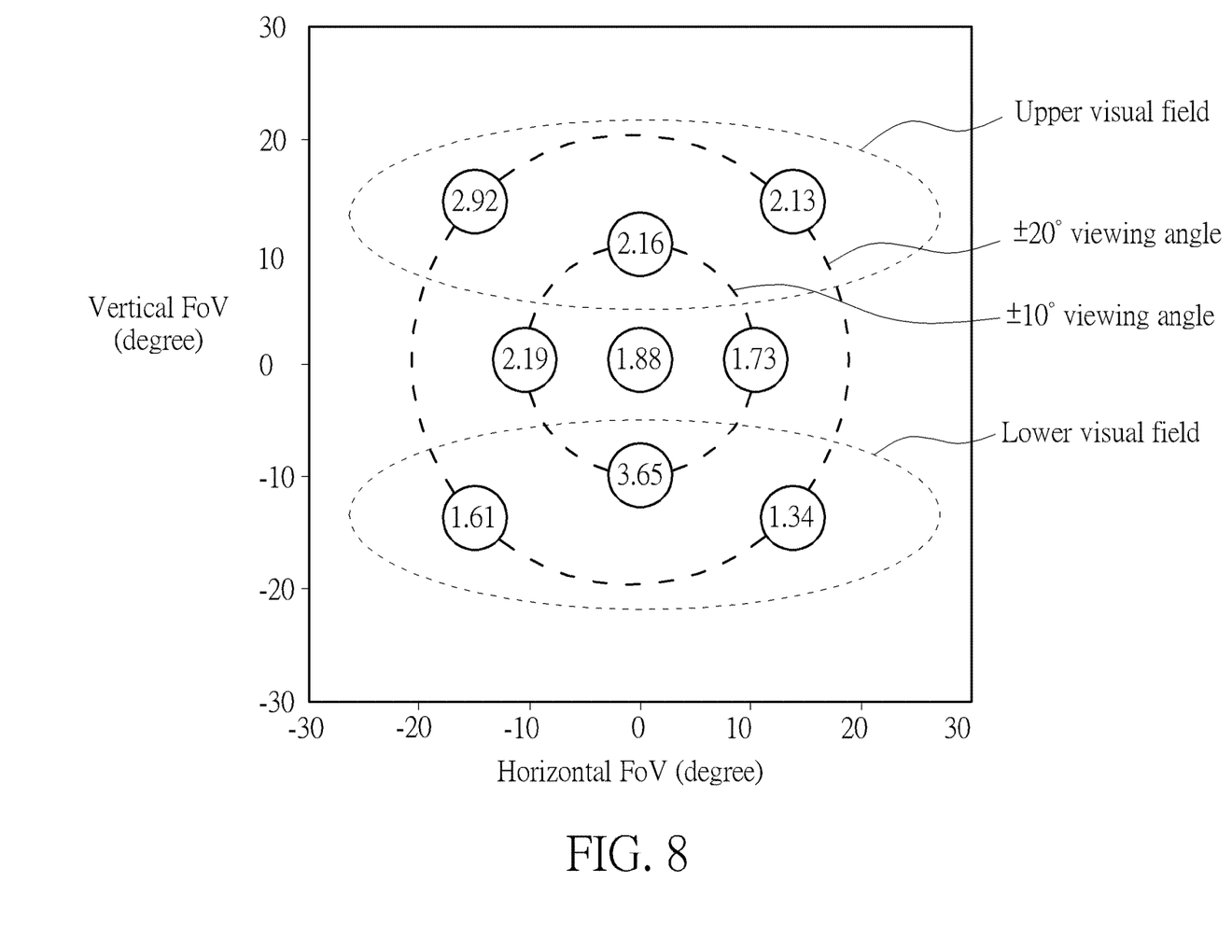
FIG. 8 is a diagram illustrating a performance map acquired in a method of providing score-based interaction according to an embodiment of the present invention.

FIG. 8 is a diagram illustrating an exemplary performance map of the eye-tracker 20 acquired in step 650 according to an embodiment of the present invention. The vertical axis represents the vertical FoV of the user in degrees, the horizontal axis represents the horizontal FoV of the user in degrees, and the numbers represent the error rate of the eye-tracker 20 in degrees at different locations in the FoV of the user. Typically speaking, the accuracy of the eye-tracker 20 decreases as the eccentricity increases. As depicted in FIG. 8, the average error rate of the eye-tracker 20 is 1.88° in the center of the FoV, the average error rate of the eye-tracker 20 is around 1.96° within ±10° viewing angle of the FoV, and the average error rate of the eye-tracker 20 is around 2° within ±20° viewing angle of the FoV. However, the numbers depicted in FIG. 8 are merely for illustrative purpose, but do not limit the scope of the present invention.

In step 660, the processor 12 is configured to acquire the performance level of the eye tracker 20 at each UI element according to the performance map of the eye-tracker 20. Referring to FIGS. 7 and 8, it is assumed for illustrative purpose that the error rate of the eye-tracker 20 at the UI element $UIE_1$ is around 2.92°, the error rate of the eye-tracker 20 at the UI element $UIE_2$ is around 2.13°, the error rate of the eye-tracker 20 at the UI element $UIE_3$ is around 1.61°, and the error rate of the eye-tracker 20 at the UI element $UIE_4$ is around 1.34°.

In step 670, the processor 12 is configured to acquire the score of each UI element based on the performance level of the eye tracker 20 at each UI element and the distance between the estimated gaze point GZ of the user and each UI element. In an embodiment, the score SCn of a UI element $UIE_n$ may be calculated based on the following equation (1), wherein $d_n$ represents the distance between the estimated gaze point GZ and the UI element $UIE_n$, ERn represents the error rate of the eye-tracker 20 at the UI element $UIE_n$, W1 is the distance weighting, and W2 is the accuracy weighting.

$$SCn = W1(1/dn) + W2(ERn/dn) \qquad (1)$$

In step 680, the processor 12 is configured to set the UI element with the highest score as the target UI element associated with the estimated gaze point GZ of the user.

In an embodiment when the distance is the only factor for determining the gaze-based interaction, the distance weighting W1 may be set to 1 and the accuracy weighting W2 may be set to 0. As depicted in FIGS. 7 and 8, the score SC1 of the UI element $UIE_1$ is 0.8, the score SC2 of the UI element $UIE_2$ is around 0.67, the score SC3 of the UI element $UIE_3$ is 1, and the score SC4 of the UI element $UIE_4$ is 0.909. Under such circumstance, the UI element $UIE_3$ with the highest score is set as the target UI element associated with the estimated gaze point GZ of the user.

In another embodiment when both the distance and eye-tracking performance are taken into consideration for determining the gaze-based interaction, the distance weighting W1 may be set to 1 and the accuracy weighting W2 may be set to 1. As depicted in FIGS. 7 and 8, the score SC1 of the UI element $UIE_1$ is around 3.136, the score SC2 of the UI element $UIE_2$ is around 2.087, the score SC3 of the UI element $UIE_3$ is around 2.61, and the score SC4 of the UI element $UIE_4$ is 2.127. Under such circumstance, the UI element $UIE_1$ with the highest score is set as the target UI element associated with the estimated gaze point GZ of the user.

In step 690, the processor 12 is configured to determine whether the target UI element is triggered. The hit box of the specific UI element is triggered by the gaze command of the user when one or multiple predefined trigger conditions are satisfied. The above-mentioned predefined trigger conditions may include, but not limited to, user's gaze fixed longer than the fixation duration of the specific UI element, another button being pressed, a voice command being issued, intentional user blinks, or certain gaze path/pattern being detected.

In step 700, a corresponding action associated with the target UI element is performed if it is determined that the specific UI element is triggered based on the one or multiple gaze points of the user. The above-mentioned predefined actions may include, but not limited to, content selection, previous, next, setting, close, back, home, show notification and lock screen.

Figure 9:
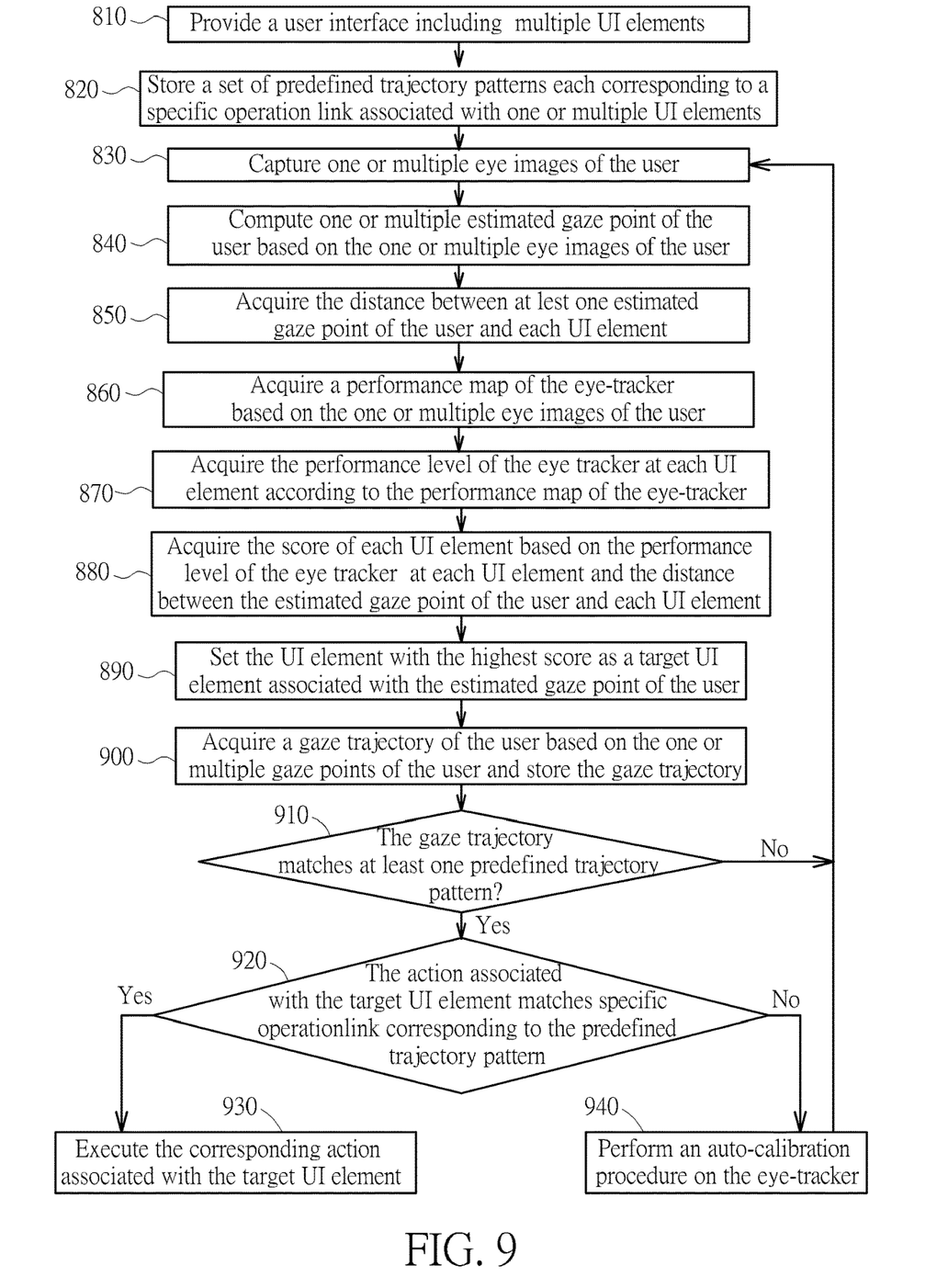
FIG. 9 is a flowchart illustrating a method of providing score-based interaction and trajectory-based interaction according to an embodiment of the present invention.

FIG. 9 is a flowchart illustrating a method of providing score-based interaction according to an embodiment of the present invention.

Step 810: provide a user interface including multiple UI elements.

Step 820: store a set of predefined trajectory patterns each corresponding to a specific operation link associated with one or multiple UI elements.

Step 830: capture one or multiple eye images of the user.

Step 840: compute one or more estimated gaze points of the user based on the one or multiple eye images of the user.

Step 850: acquire the distance between at least one estimated gaze point of the user and each UI element.

Step 860: acquire a performance map of the eye-tracker 20 based on the one or multiple eye images of the user.

Step 870: acquire the performance level of the eye tracker 20 at each UI element according to the performance map of the eye-tracker 20.

Step 880: acquire the score of each UI element based on the performance level of the eye tracker 20 at each UI element and the distance between the estimated gaze point of the user and each UI element.

Step 890: set the UI element with the highest score as a target UI element associated with the estimated gaze point of the user.

Step 900: acquire a gaze trajectory of the user based on the one or multiple gaze points of the user and store the gaze trajectory of the user.

Step 910: determine whether the gaze trajectory of the user matches at least one predefined trajectory pattern; if yes, execute step 920; if no, execute step 830.

Step 920: determine whether the corresponding action associated with the target UI element matches the specific operation link corresponding to the predefined trajectory pattern; if yes execute step 930; if no, execute step 940.

Step 930: execute the corresponding action associated with the target UI element.

Step 940: perform an auto-calibration procedure on the eye-tracker 20; execute step 830.

In the embodiment depicted in FIG. 9, both trajectory-based interaction in FIG. 3 and score-based interaction in FIG. 6 are used for providing accurate eye-tracking in interactive virtual environment. In steps 850-890, the target UI element which is most likely to be associated with an estimated gaze point is determined first, as depicted in FIG. 7. Next in steps 900-910, the gaze trajectory of the user may be identified and compared to a set of predefined trajectory patterns. If the gaze trajectory of the user matches at least one predefined trajectory pattern, the correspondence between the action associated with the target UI element and the specific operation link corresponding to the predefined trajectory pattern may be checked in step 920. If the action associated with the target UI element matches the specific operation link associated with the predefined trajectory pattern, the action associated with the target UI element may be executed in step 930.

In step 940, an auto-calibration procedure may be performed on the eye-tracker 20 when it is determined in step 920 that the action associated with the target UI element does not match the specific operation link corresponding to the predefined trajectory pattern. More, specifically, the mismatch between the action associated with the target UI element and the specific operation link corresponding to the predefined trajectory pattern may indicate severe inaccuracy of the eye-tracker 20. Under such circumstance, the estimated gaze points acquired based on the data captured by the eye-tracker 20 may greatly deviate from the actual gaze positions of the user, but the relative motion of consecutive gaze points remains accurate. Therefore, the actual UI element which the user intends to interact with may be seen as the UI element associated with an action corresponding to the action associated with the predefined trajectory pattern. The geometric relation between the specified UI element and the one or more estimated gaze points may be used to calibrate the eye-tracker 20 in step 940.

In the present optical system, trajectory-based interaction and/or score-based interaction may be provided for reducing the accuracy requirement of the eye-tracking operation. Therefore, the present invention can provide accurate eye-tracking in interactive virtual environments.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical system which provides accurate eye-tracking in interactive virtual environment, comprising:
    an eye-tracker, comprising:
        a sensor module configured to capture one or multiple eye images of a user; and
    a head-mounted display, comprising:
        a processor configured to:
            provide a user interface which includes one or multiple user interface (UI) elements based on one or multiple gaze points of the user which are computed based on the one or multiple eye images;
            acquire a distance between at least one estimated gaze point of the user and each UI element;
            acquire a performance map of the eye-tracking operation based on the one or multiple eye images of the user, wherein the performance map represents the eye-tracking operation relative to an initial field of view of the user when the user looks straight ahead;
            acquire a performance level of the eye-tracking operation at each UI element according to the performance map of the eye-tracking operation;
            acquire a score of each UI element based on the performance level of the eye-tracking operation at each UI element and the distance between the at least one estimated gaze point of the user and each UI element; and
            set a first UI element with a highest score among the one or multiple UI elements as a target UI element associated with the at least one estimated gaze point of the user; and
        a display configured to present the user interface.

2. The optical system of claim 1, wherein the score of each UI element is inversely proportional to the distance between the at least one estimated gaze point of the user and each UI element.

3. The optical system of claim 1, wherein the score of each UI element is positively proportional to an error rate of the eye-tracking operation at each UI element.

4. The optical system of claim 1, further comprising a data base for storing a set of predefined trajectory patterns each corresponding to a specific operation link associated with the one or multiple UI elements, wherein the processor is further configured to:
    acquire a gaze trajectory of the user based on the one or multiple gaze points of the user; and
    when the gaze trajectory of the user matches at least one predefined trajectory pattern, determine a correspondence between an action associated with the target UI element and the specific operation link corresponding to the at least one predefined trajectory pattern;
    when the action associated with the target UI element matches the specific operation link corresponding to the at least one predefined trajectory pattern, execute the action associated with the target UI element.

5. The optical system of claim 4, wherein the processor is further configured to:
    when the action associated with the target UI element does not match the specific operation link corresponding to the at least one predefined trajectory pattern, acquire a geometric relation between a second UI element among the one or multiple UI elements and the one or more estimated gaze points, wherein an action associated with the second UI element corresponds to the specific operation link corresponding to the at least one predefined trajectory pattern; and
    calibrate the eye-tracker based on the acquired geometric relation.

6. The optical system of claim 4, wherein the processor is further configured to:
    identify one or multiple segments associated with the one or multiple estimated gaze points of the user, wherein each segment is between two consecutive gaze points among the one or multiple estimated gaze points of the user; and
    acquire the gaze trajectory of the user by connecting M consecutive segments among the one or multiple segments, wherein the M is a positive integer.

7. The optical system of claim 6, further comprising a first buffer for storing the one or multiple gaze points of the user; and
    a second buffer for storing the identified gaze segments of the user.

8. The optical system of claim 6, wherein the specific operation link includes one or multiple predefined actions.

9. A method of providing accurate eye-tracking in interactive virtual environment, comprising:
    providing a user interface including one or multiple user interface (UI) elements;
    capturing one or multiple eye images of a user during an eye-tracking operation;
    computing one or multiple estimated gaze points of the user based on the one or multiple eye images of the user;
    acquiring a distance between at least one estimated gaze point of the user and each UI element;
    acquiring a performance map of the eye-tracking operation based on the one or multiple eye images of the user, wherein the performance map represents the eye-tracking operation relative to an initial field of view of the user when the user looks straight ahead;
    acquiring a performance level of the eye-tracking operation at each UI element according to the performance map of the eye-tracking operation;
    acquiring a score of each UI element based on the performance level of the eye-tracking operation at each UI element and the distance between the at least one estimated gaze point of the user and each UI element; and
    setting a first UI element with the highest score among the one or multiple UI elements as a target UI element associated with the at least one estimated gaze point of the user.

10. The method of claim 9, wherein the score of each UI element is inversely proportional to the distance between the at least one estimated gaze point of the user and each UI element.

11. The method of claim 9, wherein the score of each UI element is positively proportional to an error rate of the eye-tracking operation at each UI element.

12. The method of claim 9, further comprising:
storing a set of predefined trajectory patterns each corresponding to a specific operation link associated with the one or multiple UI elements;
acquiring a gaze trajectory of the user based on the one or multiple gaze points of the user and storing the gaze trajectory of the user; and
when the gaze trajectory of the user matches at least one predefined trajectory pattern, determining a correspondence between an action associated with the target UI element and the specific operation link corresponding to the at least one predefined trajectory pattern;
when the action associated with the target UI element matches the specific operation link corresponding to the at least one predefined trajectory pattern, executing the action associated with the target UI element.

13. The method of claim 12, further comprising:
when the action associated with the target UI element does not match the specific operation link corresponding to the at least one predefined trajectory pattern, acquiring a geometric relation between a second UI element among the one or multiple UI elements and the one or more estimated gaze points, wherein an action associated with the second UI element corresponds to the specific operation link corresponding to the at least one predefined trajectory pattern; and
calibrating the eye-tracking operation based on the acquired geometric relation.

14. The method of claim 12, further comprising:
identifying one or multiple segments associated with the one or multiple estimated gaze points of the user, wherein each segment is between two consecutive gaze points among the one or multiple estimated gaze points of the user; and
acquiring the gaze trajectory of the user by connecting M consecutive segments among the one or multiple segments, wherein the M is a positive integer.

15. The method of claim 14, wherein the specific operation link includes one or multiple predefined actions.

* * * * *